(12) United States Patent
Lauer

(10) Patent No.: US 10,061,503 B2
(45) Date of Patent: *Aug. 28, 2018

(54) NUMERIC INPUT CONTROL THROUGH A NON-LINEAR SLIDER

(71) Applicant: Onshape Inc., Cambridge, MA (US)

(72) Inventor: Michael Lauer, Harvard, MA (US)

(73) Assignee: Onshape Inc., Cambridge, MA (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/234,073

(22) Filed: Aug. 11, 2016

(65) Prior Publication Data

US 2016/0349976 A1    Dec. 1, 2016

Related U.S. Application Data

(63) Continuation of application No. 14/225,991, filed on Mar. 26, 2014, now Pat. No. 9,442,646.

(51) Int. Cl.
*G06F 3/048* (2013.01)
*G06F 3/0484* (2013.01)
*G06F 3/0485* (2013.01)

(52) U.S. Cl.
CPC ...... *G06F 3/04847* (2013.01); *G06F 3/04855* (2013.01)

(58) Field of Classification Search
None
See application file for complete search history.

(56) References Cited

U.S. PATENT DOCUMENTS

| | | | | |
|---|---|---|---|---|
| 5,371,846 A * | 12/1994 | Bates | ............. | G06F 3/04855 345/684 |
| 6,157,381 A * | 12/2000 | Bates | ............. | G06F 3/04855 345/684 |
| 7,080,324 B1 * | 7/2006 | Nelson | ............. | G06F 3/04847 715/771 |
| 7,370,286 B2 * | 5/2008 | Etgen | ............. | G06F 17/243 715/780 |
| 7,554,521 B1 * | 6/2009 | Migos | ............. | G06F 3/04847 345/156 |
| 8,073,285 B2 * | 12/2011 | Curtis | ............. | H04N 1/407 382/254 |
| 8,468,465 B2 * | 6/2013 | Warner | ............. | G06F 3/04847 707/609 |
| 9,141,267 B2 * | 9/2015 | Shah | ............. | G06F 3/04847 |
| 2007/0118810 A1 * | 5/2007 | Ubillos | ............. | G06F 3/04847 715/788 |
| 2008/0184167 A1 * | 7/2008 | Berrill | ............. | G06F 3/04847 715/833 |
| 2009/0164886 A1 * | 6/2009 | Shah | ............. | G06F 3/04847 715/243 |
| 2010/0251167 A1 * | 9/2010 | DeLuca | ............. | G06F 3/0485 715/786 |

(Continued)

*Primary Examiner* — Hua Lu
(74) *Attorney, Agent, or Firm* — Clocktower Law; Erik J. Heels; Michael A. Bartley

(57) ABSTRACT

The disclosed non-linear slider control enables a single control to rapidly change orders of magnitude in the scale of control by varying the bounds and quantization interval based on the value before the user begins a slide operation. The bigger the value is at the start, the larger the bounds and the interval. At the end of at least one slide control operation, the bounds and step interval value are recomputed.

16 Claims, 3 Drawing Sheets

(56) References Cited

U.S. PATENT DOCUMENTS

| | | | |
|---|---|---|---|
| 2012/0076404 A1* | 3/2012 | Bryant | H04N 9/77 |
| | | | 382/167 |
| 2012/0235912 A1* | 9/2012 | Laubach | G06F 3/04895 |
| | | | 345/163 |
| 2015/0113470 A1* | 4/2015 | Miller | G06F 3/04847 |
| | | | 715/777 |

* cited by examiner

NUMERIC INPUT CONTROL THROUGH A NON-LINEAR SLIDER

CROSS-REFERENCE TO RELATED APPLICATIONS

This utility patent application is a continuation of and claims priority from U.S. patent application Ser. No. 14/225,991, filed Mar. 26, 2014, titled "Numeric Input Control Through A Non-Linear Slider" naming inventor Michael Lauer, and application Ser. No. 14/225,991 is hereby fully incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2016 Onshape Inc.

BACKGROUND

Field of Technology

This disclosure relates to computer software, and more particularly to numeric input through graphical user interfaces of computer software.

Background

Ordinary sliders and steppers are common in graphical user interfaces, but they have their bounds and increments preset or configurable via text input. These are useful for making changes to values on a consistent scale, but typically not for quickly making changes where the scale between changes varies by orders of magnitude.

A variant is a graphical representation of a wheel, which has no bounds but does not necessarily provide any more functionality in scaling values. Wheels that work logarithmically—so that each increment multiplies the value by some fixed factor rather than adding a fixed number—are not bound by given scales, but do not provide nicely rounded output.

Inputting numerical values is a very common operation in software that uses graphical user interfaces, especially in inherently numeric fields such as Computer-Aided Design. Existing interfaces, typically input boxes with up and down stepper buttons and/or sliders, work well when the scale of the input is known in advance, but can be problematic when the scale can vary dynamically. Sliders need predefined bounds and quantization (the discrete values that the slider can produce), and steppers have predefined increments.

DESCRIPTION OF PRIOR ART

U.S. Pat. No. 7,370,286 "ACCESSIBLE MARKUP LANGUAGE DEFINED SLIDER CONTROL" (Etgen, May 6, 2008) discloses, in the Abstract, "A slider control which has been configured for rendering in a content browser in accordance with the present invention can include a script controlled slider track; and, coordination and control logic coupled to both the slider track and the text input field to harmonize a position of the slider track and a value specified in the text input field."

U.S. Pat. No. 7,554,521 "USER INTERFACE CONTROL FOR CHANGING A PARAMETER" (Migos et al., Jun. 30, 2009) discloses, in the Abstract, "A user interface control comprises a control for adjusting a numeric field value. The control includes controls for editing the numeric field text directly and for dynamically incrementing and decrementing the value."

None of the above provides a control that allows rapidly changing values (by dragging a control rather than typing text), that does not need predefined bounds or scales, and that allows rapid scaling and order of magnitude control changes through a single slider control. What is needed, therefore, is a control that overcomes the above-mentioned limitations and that includes the features enumerated above.

BRIEF SUMMARY

The disclosed non-linear slider control enables a single control to rapidly change orders of magnitude in the scale of control by varying the bounds and quantization interval based on the value before the user begins a slide operation. The bigger the value is at the start, the larger the bounds and the interval. At the end of the slide operation, the bounds and step interval value are recomputed such that the end of the slider operation is centered in the new bounds.

When recomputing the bounds, the quantization increments may be computed so that the slider snaps to convenient fractional values.

When the user is actively sliding, the slider acts like an ordinary slider. The slider does not rescale its bounds during interactive sliding, so the user experience is smooth and familiar.

As with some other sliders, clicking on the slide track can move the slider to the new point. Since each move rescales the slider, clicking on the track provides an easy way to rapidly scale the value up or down.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current invention. Where there is a conflict, the following definitions apply.

Text input box means a graphical user interface into which a user types text.

Numerical input box means a text input box into which a user types text that can be interpreted as a number.

Slider means a graphical user interface control that the user can slide in one dimension. Normally sliding a slider changes a value.

Slider track means a control indicating the physical bounds of a slider's range of motion. Clicking on the track may effect changes to the slider's position or perform other actions.

Stepper means a control which when clicked increments or decrements a numerical value by some amount.

Operation

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present invention.

Numerical slider controls are user interface tools for controlling values within a computer program. They may be implemented or embedded as part of program, directly linking the slider control to the value, or as compartmentalized control triggered by another program with configurable range and intervals and functionality to return a current slider position to another program to use for controlling a specific value. The program may be run on a computing device having a processor, display device such as a monitor or screen, and connected input devices such as a keyboard, mouse, touchscreen, or other pointer control input. The program also may be run remotely on a computer server with display and input devices connected to a local computer.

Figure 1A:
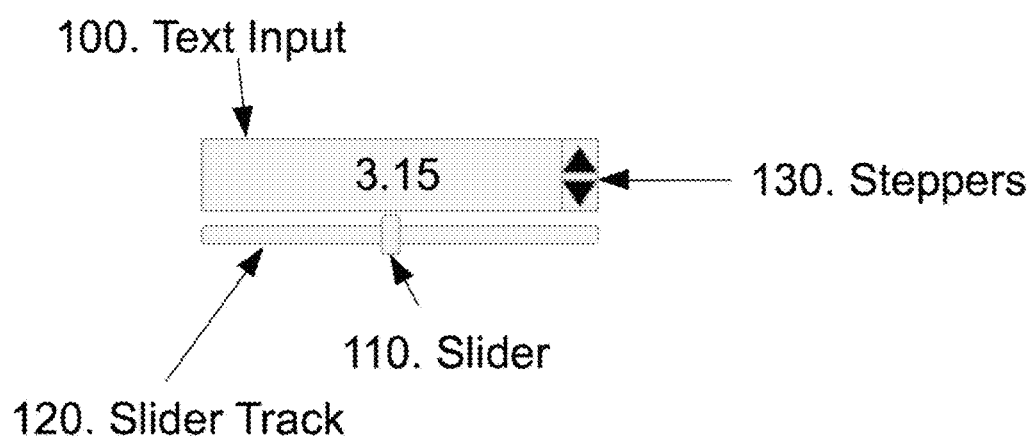
FIGS. 1A & 1B show different visualizations of the non-linear slider.
Figure 1B:
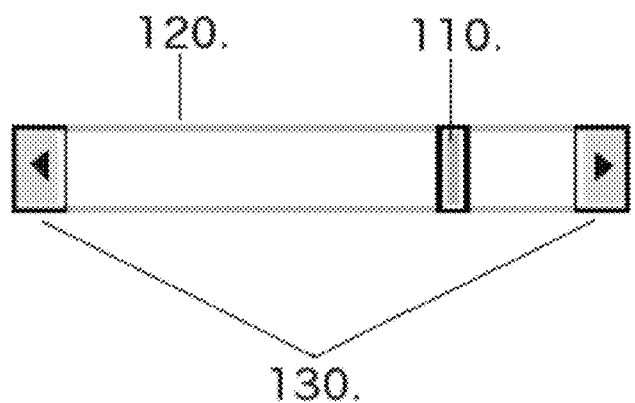

Referring to FIGS. 1A & 1B, the non-linear slider may be displayed with the visual appearance of traditional slider controls. An optional value display such as text input 100 displays the value of current slider position, slider 110 in slider track 120 enables pointer control of positioning, and optional steppers 130 enable step adjustments.

As with traditional slider controls, the control is initialized with a value which sets the current position of the slider. This value may be displayed or hidden from the user. Traditionally, the slider range and step increment are also initialized. With the nonlinear slider, the range and step increment do not need to be initialized, and instead are determined based on the initialized value.

Figure 2:
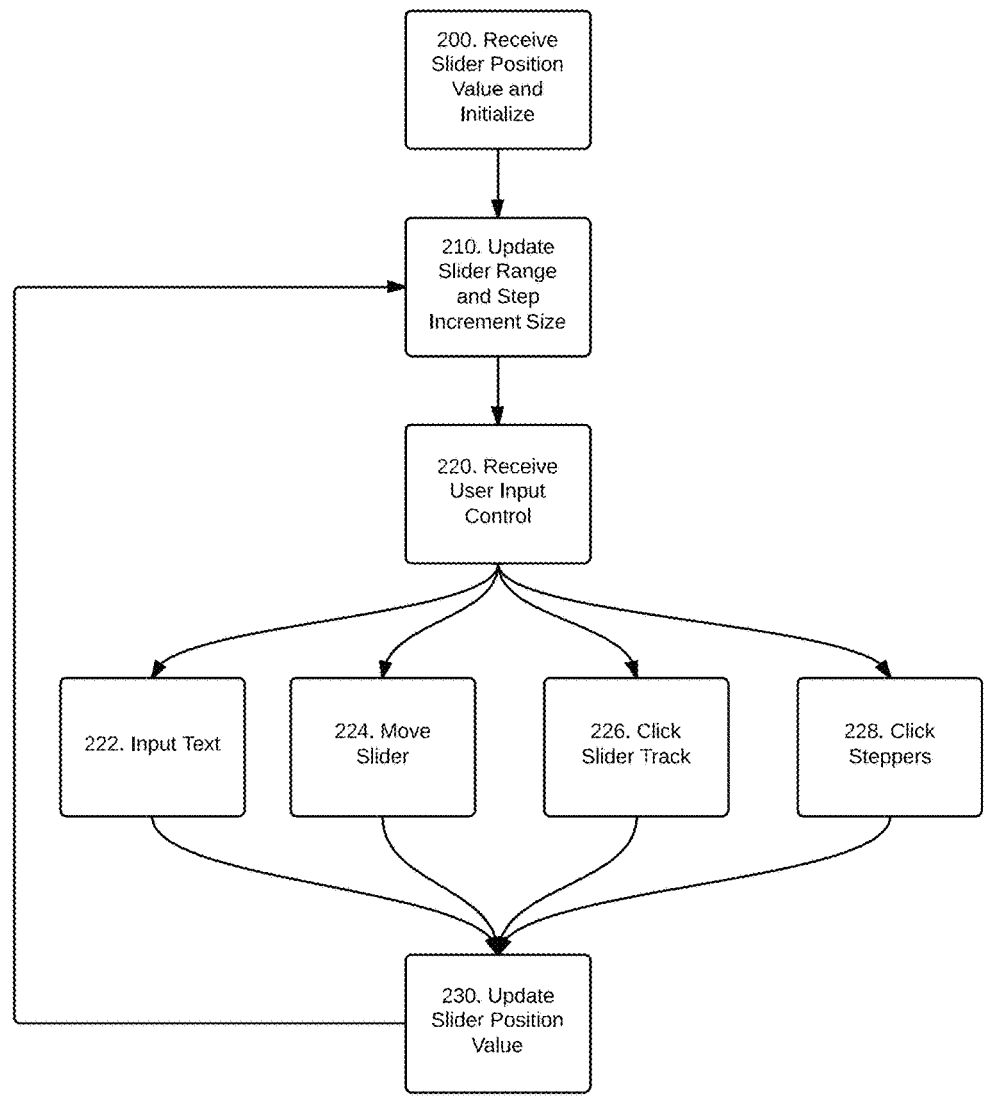
FIG. 2 is a flowchart of the logic when a user makes a change in a preferred embodiment.

Referring also to FIG. 2, after initialization 200, the nonlinear slider control is displayed in a user interface for control by a user of the computing device. The initial value is used as to center the slider control, and the slider range and increments are determined 210 based on the initial value. User input 220 through a user input device may then adjust the current slider value. For example, if a text box is included for the slider position in the slider controls, the user may input text 222 through a keyboard to change the position value. The user may move the slider 224 by selecting and dragging, such as with a mouse or other input device. The user may click in the slider track 226, or click on steppers 228 if present. Alternate forms of control may be used, such as touchscreen control to move the slider, or arrow key or mouse wheel use to utilize the steppers. In multi-user systems where the slider control applies to an object that other users may be updating remote, a remote update may also send updates to change the current slider position.

Each of the user input controls updates the slider position value 230. Typing a value directly sets the value. Sliding the slider updates the value, quantized by the current increment and the distance slid (number of increments covered times per increment change value). Clicking the slider moves the slider to the clicked position and sets the value appropriately based on the distance of the move (number of increments covered times per increment change value). Steppers increment or decrement the value by the increment.

After the value is changed, as when it is initialized, a new slider range and increments are computed 210. The changed value is used as a new center value for the slider range. A new range and increment value is determined based on the new center value. The slider position is visually updated to display in the center.

When the value is changed in any way, software on the computer device may be notified of the new value through any mechanism, including calling callbacks, firing events, or updating data bindings. The notifications may distinguish between setting the value in a discrete way—typing, clicking the slider track, using the steppers—and intermediate slider events. For example, if the slider position value is connected to the value in an operating program, such as any user configurable parameter, that value is also updated. If a program is waiting for or listening to the slider control for value changes, the new center value is returned. The new center value may be returned if any program queries the slider for the slider position value.

The adjustment to the slider scale and increments may be configured to have different degrees of impact. In a preferred embodiment, the slider range is set to double the center value, and increment values to a power of ten. Thus every slider change not only moves the slider, but also changes the order of magnitude of changes controlled by the slider for the next change. The following snippet of javascript code illustrates one possible method for such an embodiment (where value is the input value to a newly initialized slider control or the updated slider position after a change of slider position):

var scale=Math.pow(10,Math.ceil(Math.log(Math.abs (value))/Math.$LN$10));

var newStep=scale/100;

var newMax=2*Math.abs(value),newMin=0;

With this preferred embodiment, the slider control finds the smallest power of 10 greater than the new value and sets the step increment to ¹⁄₁₀₀ of that. The bounds on the range are 0 to twice the new value. With such range, the slider position after range and step increment adjustment is at the center of the slider track.

An important implication of this process is that clicking in the slider track near the right end will always double the value; clicking on the left will decrease it by a constant percentage. This makes rapid scaling easy and predictable.

OTHER EMBODIMENTS

Figure 3:
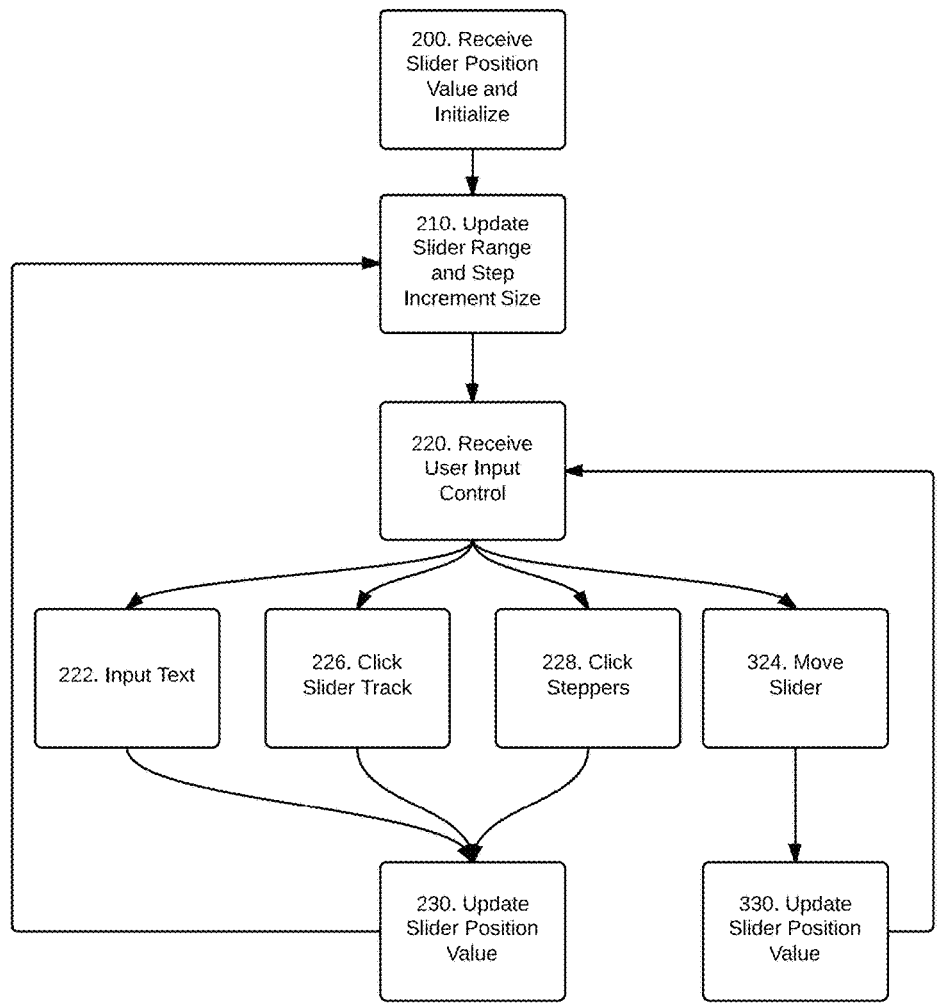
FIG. 3 is a flowchart of the logic when a user makes a change in an alternate embodiment.

In an alternate embodiment, some but not all adjustments to the slider value trigger the re-centering by calculating a new range and step increments. For example, as shown in FIG. 3, when the slider is dragged 324 on the slider track, the slider position value updates 330 based on the degree of movement (number of increments moved times increment step size), but the slider waits for further user input control without updating the slider range and step increment values. Movement by clicking in the slider track, on steppers, or through direct text input still makes the range and step increment updates which re-center the slider position. This embodiment of mixed control allows a way to rapidly change the order of magnitude of the scale (by clicking in the track or on steppers), or make consecutive adjustments on the same scale (by repeated drags of the slider).

Alternate adjustments for scale and increment may be used, such as a different range (for example, 4× instead of 2×) or increment change.

The nonlinear slider control software may be written in any of several widely available programming languages, and may be coded as a subroutine, module, subsystem, or object depending on the language and environment. In a server-client architecture it may be implemented on the server or client or any combination.

The text input may accept input and display output in any format, including fractional (as opposed to decimal) and complex arithmetic expressions. It may display and accept units.

In another alternative embodiment, the minimum value for the range of the slider is non-zero. The range and intervals may be calculated as in the preferred embodiment, based on the difference between the slider position and the minimum value. This enables fine-grain control around a large value while retaining the order of magnitude scale changes and re-centering functionality of the nonlinear slider. For flexibility with different values, the minimum value for the range may be user-configurable, such as through inclusion of an additional text input field with the nonlinear slider controls.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system for operating a nonlinear slider control comprising:
    a computing device having a processor and having built-in or connection to a display device and one or more input devices, the computer device operating software to display a slider control on the display device, the slider control having:
    a slider track;
    a slider on the slider track visually representing a current slider value;
    wherein the slider control is initialized with a current slider value and uses that current slider value to determine a range and a step interval size for the slider track;
    wherein the current slider value may be adjusted by multiple input controls; and
    wherein after a change to the current slider value by at least one of the input controls the range and step interval size for the slider track remain the same, while after a change to the current slider value by a different one or more of the input controls the range and step interval size for the slider track are redetermined based on the changed current slider value.

2. The system of claim 1, wherein the slider control further includes a text display showing the current slider position value.

3. The system of claim 2, wherein the text display is a text input field, and wherein input of a different value into the text input field changes the current slider value to the different value.

4. The system of claim 1, wherein the slider control is configured such that determination and redetermination of range and step interval size place the slider position at a mid-point of the slider track.

5. The system of claim 4, wherein the slider control is configured such that the redetermination of range is from zero to twice the changed current slider value.

6. The system of claim 5, wherein the slider control is configured such that the redetermination of step interval size is one hundredth of ten to the rounded up integer value of the logarithm of the changed current slider value with base ten.

7. The system of claim 4, wherein the slider control is further configured such that the redetermination of range uses a non-zero minimum.

8. The system of claim 7, wherein the slider control further includes a text input field for setting or adjusting the non-zero minimum.

9. A method of operating a nonlinear slider control comprising:
    operating, on a computing device having a processor and having built-in or connection to a display device and one or more input devices, software to display a slider control on the display device;
    displaying a slider track within the slider control;
    displaying a slider on the slider track visually representing a current slider value;
    initializing the slider control with a current slider value and using that current slider value to determine a range and a step interval size for the slider track;
    changing the current slider value by an input control and not changing the range or step interval size for the slider track; and
    changing the current slider value by a different input control and redetermining, based on the changed current slider value, the range and step interval size for the slider track.

10. The method of claim 9, further comprising displaying a text display of current slider position value.

11. The method of claim 10, further comprising displaying the text display as a text input field, and accepting input of a different value into the text input field to change the current slider value to the different value.

12. The method of claim 9, wherein the redetermination of range and step interval size places the slider position at a mid-point of the slider track.

13. The method of claim 12, wherein the redetermination of range is from zero to twice the changed current slider value.

14. The method of claim 13, wherein the redetermination of step interval size is one hundredth of ten to the rounded up integer value of the logarithm of the changed current slider value with base ten.

15. The method of claim 12, wherein the redetermination of range uses a non-zero minimum.

16. The method of claim 15, further comprising displaying a text input field accepting numeric text input for setting or adjusting the non-zero minimum.

* * * * *